United States Patent [19]
Hinterwaldner et al.

[11] Patent Number: 6,025,438
[45] Date of Patent: *Feb. 15, 2000

[54] ONE-COMPONENT THERMOSETTING COATING COMPOSITION

[75] Inventors: Rudolf Hinterwaldner, München; Hans-Jürgen Lesser, Rheinfelden; Axel Böttcher, Wesel; Ullrich Grundke; Klaus-Peter Liebetanz, both of Duisburg, all of Germany

[73] Assignee: A. Raymond & Cie, France

[ * ] Notice: This patent issued on a continued prosecution application filed under 37 CFR 1.53(d), and is subject to the twenty year patent term provisions of 35 U.S.C. 154(a)(2).

[21] Appl. No.: 08/716,250

[22] PCT Filed: Mar. 9, 1995

[86] PCT No.: PCT/EP95/00864

§ 371 Date: Jan. 15, 1997

§ 102(e) Date: Jan. 15, 1997

[87] PCT Pub. No.: WO95/25147

PCT Pub. Date: Sep. 21, 1995

[30] Foreign Application Priority Data

Mar. 16, 1994 [DE] Germany .............. 44 08 865

[51] Int. Cl.⁷ ...................................... C08F 8/14
[52] U.S. Cl. .......... 525/112; 428/418; 525/119; 525/530; 525/533
[58] Field of Search ................. 525/112, 119, 525/504, 530, 533; 428/418

[56] References Cited

U.S. PATENT DOCUMENTS

| | | | |
|---|---|---|---|
| 3,310,602 | 3/1967 | Lemon et al. | 525/511 |
| 3,367,913 | 2/1968 | Intorre et al. | 260/47 |
| 3,677,978 | 7/1972 | Dowbenko et al. | 525/360 |
| 4,473,674 | 9/1984 | Stoakley et al. | 525/484 |
| 4,487,914 | 12/1984 | Barton | 525/504 |
| 4,638,035 | 1/1987 | McGinniss | 525/327.3 |
| 4,680,341 | 7/1987 | Newman-Evans | 525/484 |
| 5,089,560 | 2/1992 | Gardner et al. | 525/113 |
| 5,395,913 | 3/1995 | Bottcher et al. | 525/504 |

FOREIGN PATENT DOCUMENTS 0 256 056 A2  4/1988  European Pat. Off. .
977330  12/1964  United Kingdom .

OTHER PUBLICATIONS

Form PCT/ISA/210 for PCT/EP 95/00864.

*Primary Examiner*—Robert Dawson
*Assistant Examiner*—D. Aylward
*Attorney, Agent, or Firm*—Finnegan, Henderson, Farabow, Garrett & Dunner, L.L.P.

[57] ABSTRACT

A one-component thermosetting coating composition containing of one or more chemically setting binders, at least one curing or crosslinking agent, and one or more toughening substances, the composition being semisolid and tack-free at temperatures <50° C., wherein the chemically setting binders have an average molecular weight ($M_w$) of between 500 and 250,000, a melting point of more than 50° C., a glass transition temperature of more than 20° C. and cure fully at temperatures in the range from 80 to 250° C. and in doing so reach at least 10% of the final strength within 15 seconds, wherein the binders have epoxide groups or ethylenically unsaturated groups as reactive groups, wherein the toughening substance is selected from the group consisting of butadiene-acrylonitrile copolymers having terminal carboxyl, epoxide, amino or ethylenically unsaturated groups or are highly branched aliphatic hydrocarbon epoxides, wherein at the least one curing or crosslinking agent is a metal complex of the general formula $M(SR)_xB_z$ in which M=a metal ion, L=a ligand,
SR=an acid radical ion,
B=a Lewis Base,
x=a number from 1 to 8 and
z=a number from 7 to 8, and wherein the composition may contain further additives, if desired.

9 Claims, No Drawings

ONE-COMPONENT THERMOSETTING COATING COMPOSITION

The invention relates to thermosetting coating compositions for treating surfaces consisting of different materials with a multifunctional, corrosion-, abrasion- and wear-resistant film or layer of adhesive which is tack-free at temperatures <80° C. and can be activated by means of energy.

Fastening elements which can be used to hold and/or fasten constructional and functional components on supporting substrates are adequately known. To fasten them to supporting substrates, use is preferably made of joining techniques having a mechanical and/or physical action, with all of the disadvantages associated therewith.

In the course of producing a mechanically effective fastening, the support materials are damaged by the making of punch holes and/or drill holes. In order, then, to ensure the same load-bearing capacity of the damaged material, it must be made thicker, which is often technically impracticable and uneconomical.

The physical joining techniques, on the other hand, are based preferably on various types of welding and soldering, requiring operation at very high temperatures. In the field of fastening, the physical joining methods can only be employed when the materials to be united possess sufficiently high and good properties of electrical and/or thermal conductivity. In principle, this is only the case with metal material combinations.

Despite an extremely high level of development in application, in the field of joining and fastening an economic advantage is provided by welding and soldering only, primarily, since it is possible to fasten elements with short cycle times. From a technical and quality standpoint, however, it is the disadvantages which predominate in the case of the physical joining techniques, and, moreover, they have an adverse effect on the mercantile results. Depending on the particular techniques and on the metal material combinations, these disadvantages are, inter alia, as follows:
structural changes undergone by the metal materials in the weld seam and its vicinity as a result of heating;
reduction in the strength values as a result of structural changes;
appearance of stresses in the materials as a result of non-uniform heating, some of which stresses may lead to cracks;
glassy welding sites
slag inclusions
seam not sufficiently welded through (notch effect and fracture risk)
leaky weld seams
holes in the seam
parts to be joined cannot be united by this means when they consist of different materials
relatively low breakaway torques in the case of welded or soldered fastening elements.

These and other disadvantages are in a causal relationship with the appearance of corrosion sources and/or possible instances of damage to the anticorrosion layers present on the metal material combinations following the use of mechanical and/or physical joining methods. These sources of corrosion risk can be reduced or eliminated only by means of time-consuming and cost-intensive reworking, assuming they are recognized. In addition, such combinations of materials are subject to even greater restrictions when these conventional joining techniques are employed, which in turn have an adverse economic effect.

In the processing of thermoplastics, welding is likewise used to produce simple bonds. For fastening, however, physical joining methods are of no importance in the joining of thermoplastic material combinations, since thermoplastics possess a series of adverse properties, such as creeps, low thermal stability and, possibly, the migration of plasticizing ingredients, for example.

In recent years there has been no lack of efforts in the field of fastening to eliminate the disadvantages of the mechanical and/or physical joining methods by means of conventional adhesive technology. In a few areas, these efforts have led to partial success; in other words, the fastening elements have been bonded to a substrate by means of physically or chemically setting adhesives, for which purpose customary commercial products have been employed.

In a few specific applications such adhesive fastenings may indeed be useful; however, they are unsuitable for a production system incorporating adhesive bonding and fastening. This is because the conventional adhesive systems possess a large number of disadvantages in this respect, including the following:
long evaporation, drying and setting times in the case of aqueous and/or solvent-containing, physically setting adhesive systems
long curing times in the case of reactive adhesive systems
low thermal stability and creep resistance in the case of thermoplastic backbone binders, including the physically setting hot-melt adhesives.

Even by means of physically setting and moisture-curing hot-melt adhesives it is not possible to obtain any satisfactory results. Although it is possible with the physically setting hot-melt adhesives to treat fastening elements, the films or layers of adhesive produced therewith are—as a result of their thermoplastic properties—not thermally stable and creep-resistant.

In the case of the moisture-curing hot-melt adhesives a further disadvantage is that the fastening elements treated therewith must be packed individually in order to protect them against moisture, for example from the air. They are consequently unsuitable for treating mass-produced goods. Moreover, these moisture-curing adhesives have the disadvantage that they require from 12 to 72 hours for full curing. (See inter alia R. M. Evans "Polyurethane Sealants", Technomic Publishing, PA, USA, 1993.)

Attempts have also been made to solve the fastening problems by means of pressure-sensitive adhesives. For example, French Patent 2 542 829 describes a fastening element which is provided on the joining surface with a double-sided adhesive tape. In its before-use state the layer of pressure-sensitive adhesive is covered with an abhesive protective film.

Pressure-sensitive adhesives and self-adhesive articles produced therewith are unsuitable, however, for structural joining and fastening even on account of the fact that, as a result of the "micro-Brownian" molecular motion which is permanently present in the layer of pressure-sensitive adhesive, there is, primarily, only tack at the interface with the supporting substrate, and there is no adhesion. Moreover, as a result of the "micro-Brownian molecular motion" permanently present, pressure-sensitive adhesives are subject to creep, especially on pore-free substrates. It is to this motion that the person skilled in the art, among others, attributes the self-adhesive properties. For this reason alone the pressure-sensitive adhesives are entirely unsuitable for the treatment of fastening elements, since in the case of application they are unable to develop any permanent adhesion, especially for structural adhesive bonds with a support material. Similar problems have become known from the practical use of simple self-adhesive functional components such as picture hooks.

Recent times have seen the presentation of innovative reaction hot-melt adhesives, which are suitable in particular for the structural bonding of metal automotive components. With these novel adhesives it is indeed possible, partially, to achieve certain critical adhesion parameters in the case of specific cases of fastening in assembly, but they are nevertheless unsuitable for the treatment of fastening elements on account of the fact, inter alia, that they possess at room temperature a tacky, pastelike to semisolid aggregate state and in some cases flow and creep require long initial curing and through-curing times at high temperatures, for example $\leq 5$ minutes/220° C., and therefore are unsuitable for the prior treatment of mass-produced goods—such as fastening elements—and are unsuitable for overhead mounting and wall mounting.

Consequently, they can be employed in a production system incorporating adhesive bonding only in combination with spot welding.

For production-line manufacturing, where within short periods it is necessary to mount and to fasten a large number (for example from 100 to 500 pieces) of fastening elements by hand and/or, in particular, by means of robot technology, as is the case, inter alia, in vehicle construction, the industry and commercial economy have long sought better, alternative and innovative solutions to replace physical joining in the field of fastening. However, other grounds for the demand for alternative joining methods are the limitation of the physical joining techniques to metal material combinations, and the potential hazards present. At the same time, independence is desired in combinations of materials.

When the known and conventional joining methods, as set out above, are evaluated and compared, one arrives at the realization that innovative alternatives can only be achieved by way of an integral and adhesion-based bond.

If it is desired, in addition, to eliminate with certainty the potential risk of the physical joining methods, such as, for example, corrosion, the only fastening option left in principle is the integral bond by means of adhesive bonding, whereby one would also become independent of the material. Since modern adhesive technology offered no transfer solutions, it was necessary to enter entirely new territory in developing suitable adhesive coating compositions.

The object and aim of the present invention is to provide one-component, reactive and adhesive coating compositions of this kind which are suitable for (pre)-treating elements to be connected, preferably fastening elements, with a handleable, tack-free, activatable film or layer of adhesive and which are able to create conditions such that the elements treated therewith can be employed and processed in analogy to the physical joining methods. At the same time the intention is, by means of such substitutes, to eliminate these disadvantages and known deficiencies which exist with mechanical and/or physical joining methods.

Adhesive coating compositions of this kind for fastening elements are essential prerequisites and form the basis for a novel, innovative manufacturing and assembly system incorporating adhesive fastening with high bond qualities and high economy.

The object of the present invention is achieved by using a one-component, reactive and adhesive, optionally one-piece coating composition consisting of a) one or more chemically setting backbone binders having average molecular weights ($\overline{M}_w$) of between 500 and 250,000, a melting and/or softening point of >50° C. and a glass transition temperature (Tg) >−20° C., b) one or more component(s) which serve for curing and/or crosslinking for the (pre)treatment of surfaces of fastening elements with a multifunctional, corrosion-, abrasion- and wear-resistant film or layer of adhesive which is tack-free at temperatures <50° C. and can be activated by means of energy.

In order to fulfil a range of specific tasks in production, treatment or coating and/or application, only chemically setting backbone binders are suitable for the novel coating compositions. The term chemically setting backbone binders is understood by the person skilled in the art to refer to those polymers and resins which are converted by a chemical conversion reaction into polymers of relatively high molecular weight having thermosetting properties.

In accordance with the present invention, the adhesive coating compositions are built up on the basis of those chemically setting backbone binders which possess semi-solid to solid aggregate states at temperatures <50° C. and glass transition temperatures of >−20° C. Such polymers and/or resins, prior to their curing or crosslinking, have thermoplastic properties, and only after the activation does curing or crosslinking take place, by addition polymerization, polyaddition and/or polycondensation, to form thermosetting structural polymers of high molecular weight. Moreover, chemically setting backbone binders suitable for the novel coating compositions must be able to be cured or crosslinked by means of energy, so that they are able, alone or with other reactants, to form structural adhesive layers having thermosetting properties. The average molecular weights ($\overline{M}_w$) of the backbone binders and of the other customary polymeric additives are between 500 and 250,000.

In order, then, to obtain adhesive coating compositions which can be used to produce multifunctional films or layers of adhesive on the surfaces of fastening elements, backbone binders are required which can be cured or crosslinked both by polyaddition and by addition polymerization, as has surprisingly been found. With such backbone binders it is possible to formulate the novel one-component adhesive coating compositions and to use them to produce films or layers of adhesive which by means of energy are reactivatable and curable or crosslinkable in one or more stages.

This multifunctionality of the adhesive layer is an essential requirement from practice for the adhesive layer in order to enable a sufficient functional adhesive strength to be built up and achieved, when working with very short cycle times, directly after the contact and mounting of the fastening element on a support surface.

From the class of the chemically setting backbone binders preference is given to those containing at least 2 reactive groups in the molecule. The reactive groups are preferably epoxide groups and/or ethylenically unsaturated groups. The backbone binders originate, in particular, from the class of epoxy, vinyl ester and/or (meth)acrylic resins. These resins may be aliphatic, cycloaliphatic and/or aromatic in nature, with particular preference being given to aromatic epoxy and/or vinyl ester resins of phenols, o-cresols, bisphenols, fluorene phenols, novolaks, glycidyl isocyanurates and the like, the reason being that such compounds, depending on the mode of curing, provide adhesive layers having high glass transition temperatures and particularly good resistance to aging, chemicals and heat. Particularly suitable backbone binders include those epoxy resins based on tetraglycidyldi- and/or polyamines, for example N,N,N', N'-tetraglycidyl-α,α'-bis(4-aminophenyl)-p-diisopropylbenzene.

The epoxide groups of these backbone binders can be cured or crosslinked by way of polyaddition and/or addition polymerization.

So that the fully cured thermoset adhesive films are able to withstand dynamic stresses as well, the novel coating compositions can be modified with toughening agents. In accordance with the present invention compounds particularly suitable for this purpose are so-called reactive liquid polymers based on butadienea-crylonitrile copolymers having terminal carboxyl, epoxide, amino and ethylenically unsaturated groups, such as, for example, Hycar® ATBN 1300×16 and/or reactive plasticizers and diluents based on highly branched aliphatic hydrocarbon epoxides, such as, for example, PERMETHYL® 100 epoxides and/or copolymers prepared therewith. As a result of their high reactivity, they are bound chemically into the thermosetting adhesive layer matrix.

The term "component(s) which serve(s) for curing or crosslinking" refers to reactants (hardeners) and/or reaction catalysts which are capable of converting the backbone binders and any reactive additives into a thermoset state and also, if appropriate, of accelerating the chemical setting reactions.

Depending on the choice of setting reactions, epoxides and hardeners are employed with or without accelerator/reaction catalysts, a further possibility being the reaction of epoxide and accelerator/reaction catalyst without hardeners. Components suitable for this purpose in principle are:

Hardeners: primary and secondary amino, amino amide, amino imide, aminoimidazoline, ether methanamine, mercaptan and phenolic OH groups, carboxylic acids and their anhydrides;

Accelerators/reaction catalysts: proton donors and/or electron-pair donors, such as protic and/or Lewis acids, acid catalysts, such as p-toluenesulfonic acid, dinonylnaphthalenedisulfonic acid, dodecylbenzenesulfonic acid, phosphorus acids, carboxylic acids, free-radical initiators.

For the desired rapid initial or full curing, especially for multistage curing or crosslinking, the hardeners and/or accelerators are less suitable, especially when employed alone. Substances suitable for achieving short initial and/or full curing times are preferably boron halide complexes, such as boron trifluoride amines and metal complexes of the general formula $$ML_xB_y \text{ or } M(SR)_xB_z$$

in which
M=a metal ion
L=a ligand
SR=an acid radical ion
B=a Lewis base
x=a number from 1 to 8
y=a number from 1 to 5
z=a number from 7 to 8.

Metal complex compounds of this kind, containing in particular the ions of main groups 2 and 3 and of the subgroup elements of the Periodic Table, ligands of chelate-forming compounds, acid radical ions of an inorganic acid, and Lewis bases, especially imidazole derivatives, are described in the PCT Application WO 91/13925, to which express reference is made.

Particular preference is given to complexes of the general formula $$M(SR)_xB_z$$

in which M, SR, B, x and z are as defined above, and, surprisingly, to the combination of aromatic amines and Lewis acids, preferably arylsulfonic acids.

For the curing or crosslinking of ethylenically unsaturated groups, compounds which form free radicals are required. Suitable such compounds are organic peroxides, for example benzoyl peroxide, cumene hydroperoxide, ketone peroxide, alone or in conjunction with accelerators, for example N,N,diethylaniline, toluidines.

It is a further advantage of the complexes of the general formula $$M(SR)_xB_z$$

that they activate both epoxide groups and ethylenically unsaturated groups. This enables rapid curing or crosslinking of dual-curing backbone binders with only one curing catalyst.

The curing or crosslinking of the reactive groups can also be carried out using radiation. When UV rays are used, photoinitiators and, if desired, synergists as well must be added to the novel adhesive coating compositions. In the case of ionic curing reactions, it is possible to employ the abovementioned accelerators and catalysts, for example Lewis bases and Lewis acids. In the case of free-radical curing mechanisms, photoinitiators, for example benzil dimethyl ketal, and, optionally, synergists, for example 4-dimethylaminobenzoic acid, are required.

For electron beam curing no additives are necessary.

The novel coating compositions can be modified by means of further additives. Suitable additives include inorganic and/or organic fillers, reinforcing fibers, pigments, dyes, thixotropic agents, wetting agents, adhesion promoters, and the viscoplasticizing reactive substances (toughening agents) described above.

By means of a careful selection of the curing systems and/or of the components which serve for curing, influence is exerted over the response temperatures or activation temperatures and curing rates, and the end properties which can be achieved, especially the structural strengths, of the novel coating compositions and their adhesive layers. In order, then, to enable operation with cycle times analogous to those for the physical joining methods, with the fastening elements treated with an adhesive layer, it is advantageous, as has surprisingly been found, to employ dual curing systems. The term dual and/or multifunctional curing systems refers, in accordance with the present invention, to a) chemical setting by polyaddition, ionic addition polymerization and/or b) single- and multistage curing or crosslinking with the supply of energy.

The initiation of the curing reactions or chemical setting reactions in the novel compositions and their adhesive layers takes place at response temperatures or activation temperatures of >80° C., which, consequently, are also the curing and/or crosslinking temperatures.

The response or activation temperatures can be adjusted within wide temperature ranges, and are preferably between 80 and 250° C. The curing rates are not determined solely by the response and activation temperatures but additionally by further rises in temperature by means of the supply of energy. Rising temperatures increase the curing rates and reduce the curing times of the novel adhesive layers considerably.

Another significant parameter is the time-dependent development and buildup of a functional strength with the novel coating compositions and their adhesive layers. This requirement from practice is placed purely on economic grounds. The term "functional strength" refers to the necessary initial adhesive strength in the case of bonded pairs of joined components so that they can be subjected to further operations in the manufacturing process. In general it is $\geq 10\%$ of the final strength.

The development and buildup of the functional strength is, in the case of the novel adhesive layers, also a time-dependent and temperature-dependent curing function. In order to make it possible for the elements treated with novel adhesive layers to be employed in innovative production and assembly systems incorporating adhesive bonding and fastening as well, functional strength must be developed in periods <60 seconds, preferably <15 seconds and, in particular, <10 seconds. This can be achieved with the novel adhesive layers, as has surprisingly been found, by selecting dual-functional or multifunctional curing systems having low and/or different response or activation temperatures, and/or initiating curing at temperatures above the response or activation temperatures.

The term "multifunctional" adhesive films, which are produced by means of the novel coating compositions on the surfaces of joining elements and fastening elements, relates preferably to the curing or crosslinking temperatures and times. Since in the field of fastening in particular, especially for production-line assemblies, short initial curing and through-curing times are required on economic grounds, this state of affairs is a particularly characteristic feature in the selection of the backbone binders, of the component(s) which serve(s) for curing or crosslinking and in the case of the compositions of the novel coating systems. This becomes particularly evident when "spontaneous" functional strengths are required in the application of joining elements and fastening elements.

In order to enable this aim to be achieved with the adhesive layers of the novel coating compositions, the adhesive layers are advantageously to be treated with a multistage curing system. In manufacturing systems incorporating adhesive bonding and fastening there is also a requirement for multifunctional curing systems if it is possible with such systems to meet changing requirements, for example detachable and/or other adhesive bonds. The multifunctionality of the novel adhesive layers has its foundation, additionally, in the fact that in addition to the principal function of adhesive bonding they have to take over further essential duties, including:

corrosion resistance abrasion resistance and wear resistance freedom from tack before and after curing resistance to temperature, aging and/or chemicals, and/or long-term stability universal fastening elements independent of the material used.

These requirements are placed on the novel adhesive layers, in particular, when the joining and fastening elements involved are mass-produced and/or bulk products.

However, the novel adhesive layers also meet further critical parameters as are known from production-line manufacturing and assembly operations. For example, in vehicle construction a high number of joining and fastening elements are already mounted, for production reasons, on the untreated body. Since at this stage of manufacturing the surfaces of the untreated body have not yet been cleaned or degreased, the conditions are not ideal for adhesion. In order, nevertheless, to make it possible to ensure the required "spontaneous" or "immediate" functional strengths, especially in the case of application of the joining or fastening elements by means of robots, the novel adhesive layers must possess high oil and fat absorption and/or binding properties and at least very high initial curing rates.

Depending on the selection of raw materials, especially in the case of the backbone binders and the hardener systems, it is possible with the novel coating compositions to produce structural adhesive layers which possess glass transition temperatures of up to 250° C. and temperature resistance up to 300° C. after through-curing.

The preparation of the novel coating compositions and the treatment or coating of the surfaces of joining and fastening elements are carried out using known techniques. The coating compositions are prepared by preheating the meltable components to their melting point and homogeneously mixing the hardener component(s) in the melt at below the reaction response temperature.

If the joining and fastening elements are coated by means of rolling, dipping, spraying and the like, the novel coating compositions are processed from their solutions, dispersions and/or melts. This type of application, from a liquid phase, has an important influence on the manner of preparation. For treating mass-produced and/or bulk goods, solutions, melts and/or dispersions are preferred. Melts are particularly suitable for this purpose since they can be processed in an eco-friendly and industrially hygienic manner.

A coating composition solution is prepared by dissolving the backbone binders in an appropriate inert organic solvent, for example methyl ethyl ketone or toluene, and then homogeneously mixing in the other additives. The solids content is determined by the processing rheology and the subsequent layer thickness of the adhesive layer.

In the preparation of aqueous dispersions, the adhesive layers have to be incorporated by dispersion from their melt into an aqueous phase, for which high-speed stirring and mixing tools are required. The use of dispersants or emulsifiers and, if appropriate, the presence of small amounts of organic solvents may be very useful in this case. When a stable dispersion is present, the remaining substances are mixed in and, if required, incorporated by dispersion.

Such aqueous dispersions are particularly suitable for coating by means of electrophoretic deposition.

To produce and prepare novel adhesive melt compositions it is possible to employ heated melt kneading units or screw extruders which operate discontinuously or continuously. In this case it is necessary to operate at temperatures below the response or activation temperatures with very short residence times.

For electrostatic powder coating, in contrast, the constituents of the novel coating compositions are preferably prepared in a so-called oscillating single-screw extruder.

The joining and fastening elements to be treated with a novel adhesive layer can be produced from different materials and in molds. Suitable materials include metals, plastics, cellulose material, inorganic materials and many others. So that the novel coating compositions provide optimum wetting of the surfaces of the joining and fastening elements and adhere to them, these surfaces are cleaned, degreased and subjected if appropriate to specific surface treatments. These surface pretreatments can be carried out, inter alia, by means of jets, corona discharge, low-pressure plasma, erosion. If desired, the pretreated surfaces can be provided with adhesion promoters and/or "adhesion primers" in order to improve adhesion of the adhesive layers, which are to be applied subsequently, to the boundary surfaces.

The treatment and coating of the joining and fastening elements with a novel adhesive layer is carried out in accordance with known techniques, for example by means of rolling, dipping, nozzle and/or spraying devices from solutions, dispersions and/or melts of the novel coating compositions, airless spraying being particularly preferred in the case of spray application;

electrophoretic deposition coating from dispersions of the novel coating compositions;

electrostatic powder coating from compounded, flowable powder particles.

For the treatment and/or coating of the joining and fastening elements it is possible in addition to use so-called mixing and metering devices. They offer advantages, especially in the case of highly reactive adhesive coating compositions, especially when they are employed as melts. In the case of this technique, the component which serves for curing or crosslinking is mixed in homogeneously shortly before application, for example from a nozzle, and the reactive adhesive melt is cooled directly on the adhesive surface to be treated, and is thereby inactivated. Mixing and metering devices of this kind provide for mixing and metering accuracies of about 1 mg.

The adhesive layers prepared from a solution and/or dispersion must subsequently be subjected to drying. The adhesive layers produced from the melt solidify merely by cooling.

The amount of energy required for coating and/or drying is specific to each product, in order for the degrees of heating of the novel adhesive layers to remain below the response temperatures of curing or crosslinking. In this way it is possible to eliminate instances of adhesive-layer damage which would have adverse effects, inter alia, in the development of the functional strengths, as has surprisingly been found.

A further subject is the curing or crosslinking of the adhesive layers and the production of structural adhesive bonds between joining and fastening elements and the surfaces of support materials. The reactivation and curing or crosslinking of the novel adhesive layers takes place by supplying energy. Depending on the hardener system employed and on the existing functionalities in the novel adhesive layers, the energy sources must be capable of providing, in the short term, quantities of thermal energy which are able to produce temperatures of between 80 and 350° C. In the case of curing or crosslinking a distinction must be made between response temperatures and activation, curing and/or aftercuring temperatures, since these have an influence on the multifunctionality of the adhesive layers. If, for example, adhesive layers are activated with more functional hardener systems, then the response or activation temperature is preferably <10° C. below the temperature required for through-curing and/or aftercuring, in order to make it possible to ensure the spontaneous development of the functional strength.

Curing or crosslinking can also be carried out in a plurality of stages if this is required on the part of practice.

The novel adhesive layers can be activated and cured or crosslinked using the following preferred types of energy:

thermal energy, such as hot air, steam radiation energy, such as actinic light, especially UV rays in the wavelength range from 420 to 100 nm;
  laser beams;
  infrared rays;
  electron beams in the low-energy acceleration range from 150 to 300 keV at a dose distribution of from 0.5 to 10 Mrad=from 5 to 100 kGy high frequency and microwave ultrasound, especially with magnetostrictive transmitters at frequencies between 2 and 65 kHz friction and agitation.

In order to reduce the temperature gaps between the existing ambient temperature and the required response temperature for activating the novel adhesive layers it is possible to preheat the joining and fastening elements and, if appropriate, the fastening points on the support surface as well. These preheating temperatures are advantageously a few ° C. below the melting and softening points of the adhesive layers. By means of these measures it is possible significantly to shorten minimum curing times required to obtain functional strengths.

In order to be able to employ efficiently, in innovative manufacturing and assembly systems incorporating adhesive fastening, the joining and fastening elements treated with a novel adhesive layer it is possible, for example, to modify the conditions of known, physical joining methods such that they can be employed for activating and curing the novel adhesive layers.

By means of the provision of one-component adhesive or one-piece coating compositions according to the present invention, principles, perspectives and preconditions for the (pre)treatment of joining and fastening elements with curable, multifunctional films or layers of adhesive have been created which can also be integrated into new, innovative manufacturing and assembly systems incorporating adhesive fastening. Since the fastening elements treated with the novel adhesive layers can be processed in analogy to the known physical joining methods in the technical field of fastening, a relatively high level of economy in application is also ensured at the same time.

A further essential technical and economic advance is provided by the present invention in that the joining and fastening elements themselves can be manufactured from different materials and the joining and fastening elements treated with the novel coating compositions are suitable for producing structural adhesive bonds independent of the material and are thus capable of universal application.

Some of the advantages, in dependence on the respective material combinations and use conditions, for the joining and fastening elements treated with the novel adhesive layers, are as follows:

1. Joining and fastening elements one-component joining and fastening elements treated with energy-activatable adhesive layers and consisting of different materials, having good stability on storage tack-free, manageable, abrasion- and wear-resistant adhesive-layer surfaces stable and high-grade corrosion protection before and after curing multifunctional adhesive layers with good adhesion to support materials can be used on greasy and/or oily surfaces individually adjustable, low response temperatures and rapid curing times early functional adhesive strengths >10% of the final strengths low-shrinkage and/or no-shrinkage initial curing and through-curing high tensile strength values up to 25 N/mm$^2$ high breakaway torques, amounting to at least twice those of welded elements high temperature resistance (up to 350° C.) and high glass transition temperatures (Tg) of up to 250° C.

good aging and/or chemical resistance, and/or-long-term stability high toughness of the cured adhesive layer.

2. Adhesive bonds bonding or adhesive fastening of similar and dissimilar material combinations uniform distribution of stresses in the bonded joints, perpendicular to the direction of loading no thermal distortion of components insulating and/or sealing function of the adhesive layer high dynamic strengths high vibration damping.

The invention is illustrated by, but not limited to, the examples which follow.

EXAMPLE 1

The following adhesive coating composition was prepared:

100 parts by weight (pbw) of N,N,N',N'-tetraglycidyl-α,α'-bis (4'-aminophenyl)-p-diisopropylbenzene, having an epoxy equivalent of 160 and a melting point of 65° C., were dissolved in 100 pbw of methyl ethyl ketone at 25° C. Subsequently, 60 pbw of α,α'-bis(4-aminophenyl)-p-diisopropylbenzene as hardener and 0.8 pbw of dodecylbenzenesulfonic acid as catalyst were added to and homogeneously dissolved in this backbone binder solution. To build up a heat-resistant thixotropic and to reinforce the adhesive coating composition, 1.0 pbw of aramid fiber pulp was incorporated into the composition using a high-speed dissolver.

The finished adhesive coating composition possessed highly thixotropic properties.

This coating composition was used to treat steel bolts with an adhesion area of 112 mm². The solvent was evaporated off in a drying oven. The thickness of the adhesive layer on the steel surfaces was between 50 and 60 µm. Following the evaporation of the solvents, the adhesive layer adhered firmly to the steel substrate and was dry and tack-free.

The adhesive bolts treated with adhesive layer were used to carry out adhesive bonds on a steel panel. Half of the steel surface was degreased with acetone and cleaned. The other half remained uncleaned.

5 bolts each were preheated to 60° C. in a drying oven. The steel panel was preheated on a temperature-regulable hotplate. During adhesive bonding, the surface of the steel panel had a temperature of 180° C.

The preheated steel bolts treated with the adhesive layer were pressed briefly onto the steel surface which was at 180° C. After 5 seconds, the steel plate together with the stuck-on bolts was removed from the hotplate and cooled at room temperature. After cooling to 25° C., the tensile strength values were determined. These were on average 300 N—based on an adhesive area of 112 mm².

5 more coated steel bolts were bonded—as described above—on a 2nd steel panel, but with the modification that the adhesive layers were cured at 180° C. for 20 minutes. After cooling this test panel with stuck-on fastening bolts at 25° C., the tensile strengths and the breakaway torques were determined.

Tensile strength cleaned adhesive area: 1800 N/112 mm² uncleaned adhesive area: 1750 N/112 mm²

Breakaway torques on rotation:

cleaned adhesive area: 10 Nm/112 mm² uncleaned adhesive area: 10 Nm/112 mm²

These strength values demonstrate that the adhesive coating composition has a high oil absorption and binding capacity and has virtually no effect on the adhesive strengths.

EXAMPLE 2

Example 1 was repeated with the modification that the hardener and catalyst were replaced by a metal complex compound in accordance with WO 91/13925 and, in addition, a pre-adduct was added as toughness modifier. The quantity of $FeSO_4$ (imidazole)$_8$ complex added was 10 pbw. Furthermore, 20 pbw of a pre-adduct of butadiene-acrylonitrile copolymer having terminal amino groups and a highly branched aliphatic hydrocarbon epoxide PERMETHYL 100 Epoxide (1 : 1) were added.

The fastening bolts treated with this adhesive coating composition, following evaporation of the solvent, had dry and tack-free surfaces.

The testing of the coated steel bolts gave the following values:

response temperature: 150° C.

curing time at 210° C.: 60 seconds tensile strength: 1200 N/112 mm² breakaway torques: 15–16 Nm/112 mm²

EXAMPLE 3

15 parts by weight of cobalt sulfate (imidazole)$_8$ complex were added at 70–80° C. in the melt to 100 parts by weight of an o-cresol-novolak epoxy resin modified with carboxyl-terminated butadiene-acrylonitrile rubber (epoxide equivalent about 225, softening point about 70° C.), and the mixture was briefly homogenized in an extruder.

This adhesive melt was used to coat the adhesive areas of metal bolts, which were then cooled.

Using these adhesive bolts treated in this way, two-stage curing was carried out. After a residence time of 10 seconds at 110° C. in the 1st stage, a functional strength of 250 N/112 mm² (tensile strength) was achieved (elimination of 2 mol of imidazole). Aftercuring for 10 seconds at 210° C. gave a tensile shear strength of 2700 N/mm² and a breakaway torque of 18–22 N/m.

EXAMPLE 4

100 parts by weight of epoxy resin from Example 3 were admixed in the melt with 50 parts by weight of pyromellitic anhydride (hardener) and 5 parts by weight of the metal complex compound ($NiSO_4$ (methylimidazole)$_7$ complex) and the mixture was homogenized on an extruder. It was then used to treat the adhesive areas of aluminum bolts. The following values were found:

curing temperature (inductive heat): 220° C.

curing time: 6 seconds tensile strength: 1750 N/112 mm² (material fracture)

breakaway torque: 19–21 Nm (material fracture)

EXAMPLE 5

The epoxy resin of Example 3 was melted at 80° C., 4 parts by weight of dicyandiamide and 4 parts by weight of the metal complex compound (FeSO$_4$ (imidazole)$_8$ complex) according to Example 2 were mixed into the melt, and the mixture was homogenized in a single-screw extruder. The steel bolts treated with this mixture gave the following values:
curing time: 18 seconds at 200° C.
tensile strength: 2400 N/112 mm$^2$
breakaway torque: 18–20 Nm

EXAMPLE 6

1 mol of the epoxy resin from Example 3 was reacted with one mole of acrylic acid at a terminal epoxide group. 2 parts by weight of each of the photo-initiators Irgacure® 189 and 652 (manufacturer CIBA-GEIGY) were mixed homogeneously into the melt of this dual-functional backbone binder obtained in the manner described, having one epoxide group and one acrylic group in the molecule, and this mixture was used to treat metal bolts. Prior to adhesive bonding, the adhesive layer on the bolts was heated and activated under an 80 W UV lamp and an infrared source for 30 seconds. The bolts with the activated adhesive layer were pressed onto a steel panel. After 2 seconds, the functional strength was found to be 150 N/112 mm. Subsequently, the bonded pairs of joining parts were aftercured in a hot oven at 180° C. for 30 minutes, and the following values were found:
tensile strength at 23° C.: 1800 N/112 mm$^2$
tensile strength at 150° C.: 1400 N/112 mm$^2$
tensile strength at −25° C.: 1900 N/112 mm$^2$

EXAMPLE 7

The adhesive coating composition of Example 2 was used to treat 10 similar fastening elements, made of a glass fiber-reinforced, partly aromatic polyamide, with a 50 µm layer of adhesive.

The fastening elements, preheated to 60° C., were bonded to a steel plate at 180° C.

After cooling the test specimen at room temperature it was not possible to determine any tensile strength values or breakaway torques since material fracture occurred in the plastic.

EXAMPLE 8

Example 1 was repeated with the modification that the epoxy resin was replaced by a solid novolak epoxy resin having an epoxy equivalent weight of about 230 and the quantity of hardener was reduced to 50 pbw. Finally, the finished solution of the adhesive coating composition was diluted further with methyl ethyl ketone to a dippable viscosity of 50 seconds, measured in the 4 mm DIN cup.

In this dipping solution, fastening elements of metal and plastic were coated by immersion followed by draining and drying at 50° C. 2-fold dipping gave an adhesive layer with a thickness of 70 µm.

The fastening elements, bonded at 220° C. and cured for 2 minutes, had tensile strengths of from 1200 to 1400 N/112 mm$^2$/20° C.

Some of these bonded fastening elements were aftercured at 210° C. for 180 minutes. The subsequently determined tensile strengths were from 1700 to 1800 N/112 mm$^2$/20° C.

EXAMPLE 9

Test elements of bodywork steel sheet (150×100×0.8 mm) were treated along the lengthwise edge with the adhesive from Example 3 in a width of 120 mm and a thickness of 100 µm.

Uncoated test elements were placed on the cleaned adhesive areas of the adhesive-treated test elements, and, with heating, both areal and spot adhesive bonds were produced.

The areal adhesive bonds were produced in a heated press (200° C.) with a residence period of 30 seconds. The spot adhesive bonds were produced by pressing the overlapping adhesive areas together using tongs, fitted with heatable pressing jaws (Ø 120 mm), at a temperature of 300° C. for 40 seconds.

Some of the bonded test specimens were aftercured at 180° C. for 30 minutes. After cooling, the bonded composite elements were used to produce test specimens each having an adhesive area of 250×120 mm.

The following tensile shear strength values (DIN 53 281-T 02-79-A) were found: (average values of 5 measurements in each case)

|  | Functional strength N/mm$^2$ | Final strength N/mm$^2$ |
|---|---|---|
| Areal bond | 11 (after 30 sec./200° C.) | 35 (30 min/180° C.) |
| Spot bond | 10 (after 40 sec./300° C.) | 32 (30 min/180° C.) |

What is claimed is:

1. A one-component thermosetting coating composition consisting of at least one chemically setting binder, at least one curing or crosslinking agent, and at least one
    said composition being semisolid and tackfree at temperatures <50° C.,
    wherein the chemically setting binder has a weight average molecular weight ($\overline{M}_w$) of between 500 and 250,000, a melting point of more than 50° C., a glass transition temperature of more than −20° C. and cures fully at a temperature in the range from 80 to 250° C. and in doing so reaches at least 10% of the final strength within 15 seconds, the binder has epoxide groups or ethylenically unsaturated groups as reactive groups and is capable of being cured or crosslinked to form a thermosetting polymer,
    wherein the toughening substance is a polymer selected from the group consisting of butadiene-acrylonitrile copolymers having terminal carboxyl, epoxide, amino and ethylenically unsaturated groups, and highly branched aliphatic hydrocarbon epoxides, and which polymer is reactive so as to be chemically bound into the binder,
    wherein at the least one curing or crosslinking agent is a metal complex of the general formula M(SR)$_x$B$_z$ in which
    M=a metal ion,
    SR=an acid radical ion,
    B=a Lewis Base,
    x=a number from 1 to 8 and
    z=a number from 7 to 8
    and said curing or crosslinking agent is effective to convert said binder to a thermoset state upon the application of energy to said composition.

2. A one-component thermosetting coating composition consisting of at least one chemically setting binder, at least one curing or cross-linking agent, at least one toughening agent, and at least one additive,
    said composition being semisolid and tackfree at temperatures <50° C., wherein the chemically setting binder has a weight average molecular weight ($\overline{M}_w$) of between 500 and 250,000, a melting point of more than 50° C., a glass transition temperature of more than −20° C. and cures fully at a temperature in the range from 80 to 250° C. and in doing so reaches at least 10% of the final strength within 15 seconds, the binder has epoxide groups or ethylenically unsaturated groups as reactive groups and is capable of being cured or crosslinked to form a thermosetting polymer, wherein the toughening substance is a polymer selected from the group consisting of butadiene-acrylonitrile copolymers having terminal carboxyl, epoxide, amino and ethylenically unsaturated groups and highly branched aliphatic hydrocarbon epoxides, which polymer is reactive so as to be chemically bound into the binder, wherein at the curing or crosslinking agent is a metal complex of the general formula $M(SR)_xB_z$ in which M=a metal ion, SR=an acid radical ion, B=a Lewis Base, x=a number from 1 to 8 and z=a number from 7 to 8 and said curing or crosslinking agent is effective to convert said binder to a thermoset state upon the application of energy to said composition, and wherein said additive is selected from the group consisting of inorganic fillers, organic fillers, reinforcing fibers, pigments, dyes, thixotropic agents, welting agents, and adhesion promoters.

3. A one component fast thermosetting adhesive composition for fastening elements consisting of at least one chemically setting binder, at least one curing or crosslinking agent, at least one toughening agent and one or more additives selected from the group consisting of inorganic fillers, organic fillers, reinforcing fibers, pigments, dyes, thixotropic agents, wetting agents, and adhesion promoters, wherein the binder has a weight average molecular weight between 500 and 250,000, a melting point of more than 50° C., a glass transition temperature of more than −20° C. and cures completely at temperatures in the range from 80 to 250° C. and achieve thereby at least 10% of the final strength within 15 seconds, wherein the binder has epoxy groups, ethylenically unsaturated groups, or both, as reactive groups, wherein the toughening agent is selected from the group consisting of butadiene-acrylonitrile copolymers having terminal carboxyl, epoxy, amino and ethylenically unsaturated groups, and highly branched aliphatic hydrocarbon epoxides, wherein the binder and toughening agents are combined in such manner that the composition contains epoxy and ethylenically unsaturated groups, and wherein the curing or crosslinking agent is of the group of metal complexes of the formula $M(SR)_xB_z$, in which M=a metal ion, SR=an acid radical ion, B=a Lewis Base, x=a number from 1 to 8 and z=a number from 7 to 8.

4. An article of manufacture comprising an element fastened to a surface by the adhesive composition of claim 3.

5. The composition of claim 3, wherein the composition is dispersed into an aqueous phase or is in particle form.

6. A fastening method comprising surface treating a surface of one object to be fastened to another, and applying the composition of claim 3 to the resulting treated surface.

7. An article of manufacture which comprises the adhesive compositions of claim 3 coated on an element formed of a material selected from the group consisting of textiles, plastics, and metals or other inorganic materials.

8. The composition of claim 3, wherein the binder and the toughening agent are reacted with each other to form a polymer with ethylenically unsaturated groups and expoxy groups.

9. The article of claim 7, prepared by a method comprising heating a surface of the element to a temperature at least as high as the curing temperature of the binder and pressing the coated element onto the heated surface.

* * * * *

UNITED STATES PATENT AND TRADEMARK OFFICE
CERTIFICATE OF CORRECTION

PATENT NO.:     6,025,438
DATED:          February 15, 2000
INVENTORS:      Rudolf HINTERWALDNER et al.

It is certified that an error appears in the above-identified patent and that said Letters Patent is hereby corrected as shown below:

Claim 1, column 14, line 30, insert --toughening substance-- after "at least one".

Signed and Sealed this

Twentieth Day of February, 2001

Attest:

NICHOLAS P. GODICI

Attesting Officer

Acting Director of the United States Patent and Trademark Office